(12) United States Patent
Novellini

(10) Patent No.: US 12,149,348 B2
(45) Date of Patent: Nov. 19, 2024

(54) FAST CLOCK DOMAIN CROSSING ARCHITECTURE FOR HIGH FREQUENCY TRADING (HFT)

(71) Applicant: XILINX, INC., San Jose, CA (US)

(72) Inventor: Paolo Novellini, Gorgonzola (IT)

(73) Assignee: XILINX, INC., San Jose, CA (US)

( * ) Notice: Subject to any disclaimer, the term of this patent is extended or adjusted under 35 U.S.C. 154(b) by 101 days.

(21) Appl. No.: 17/987,659

(22) Filed: Nov. 15, 2022

(65) Prior Publication Data

US 2024/0161188 A1   May 16, 2024

(51) Int. Cl.
  *H04L 1/00* (2006.01)
  *H04L 7/00* (2006.01)
  *H04L 7/033* (2006.01)

(52) U.S. Cl.
  CPC .......... *H04L 1/0061* (2013.01); *H04L 7/0037* (2013.01); *H04L 7/0331* (2013.01)

(58) Field of Classification Search
  CPC .......... H04B 1/38; H04B 1/40; H04L 1/0061; H04L 1/0075; H04L 1/0076; H04L 1/0079; H04L 7/00; H04L 7/0008; H04L 7/0016; H04L 7/0033; H04L 7/0037; H04L 7/033; H04L 7/0331
  USPC ....... 375/219, 220, 222, 226, 243, 257, 260, 375/326, 327, 353–356; 370/278, 282, 370/350, 516, 521; 455/73, 85, 86
  See application file for complete search history.

(56) References Cited

U.S. PATENT DOCUMENTS

| | | | | |
|---|---|---|---|---|
| 7,532,697 B1 * | 5/2009 | Sidiropoulos | ........... | H04L 7/033 |
| | | | | 375/376 |
| 7,885,320 B1 * | 2/2011 | Groen | ................... | H04J 3/0685 |
| | | | | 375/376 |
| 10,419,203 B1 * | 9/2019 | Novellini | ............. | H04L 7/0331 |
| 2007/0260965 A1 * | 11/2007 | Schmidt | ................ | H04L 1/0045 |
| | | | | 714/799 |
| 2016/0191202 A1 * | 6/2016 | Barrow | ..................... | H04L 1/00 |
| | | | | 375/226 |
| 2021/0313993 A1 * | 10/2021 | Bai | ......................... | H04L 7/005 |

OTHER PUBLICATIONS

Taylor, David, et al., "All Digital VCXO Replacement Using a Gigabit Transceiver Fractional PLL," XAPP1276 (v1.2.1), Jan. 28, 2022.
Collins, Ian, "Phase-Locked Loop (PLL) Fundamentals," AnalogDialogue 52-07, Jul. 2018.

* cited by examiner

*Primary Examiner* — Young T. Tse

(74) *Attorney, Agent, or Firm* — Patterson + Sheridan, LLP

(57) ABSTRACT

A fast clock domain crossing architecture for high frequency trading includes a receiver that recovers data and a clock of a first clock domain from a communication from an exchange, functional circuitry that generates and a buy/sell command based on the recovered data and the recovered clock, format circuitry that formats the command in a second clock domain, and a transmitter that transmits the formatted command to the exchange. The architecture further includes error detection circuitry that detects bit errors that arise from an asynchronous boundary of the clock domains without increasing a round-trip latency, and/or synchronization circuitry that synchronizes the clock domains, where the synchronization circuitry includes a cleanup PLL that filters input jitter and a phase detector and variable delay line that compensate for latency within the architecture.

16 Claims, 10 Drawing Sheets

FAST CLOCK DOMAIN CROSSING ARCHITECTURE FOR HIGH FREQUENCY TRADING (HFT)

TECHNICAL FIELD

Examples of the present disclosure generally relate to a fast clock domain crossing architecture for high frequency trading.

BACKGROUND

A financial instrument exchange is a marketplace where securities, commodities, derivatives and/or other financial instruments are traded. Function of a financial instrument exchange include ensuring fair and orderly trading and efficient dissemination of price information related to financial instruments of the exchange. Financial instrument exchanges give companies, governments, and other groups a platform from which to sell securities to the investing public.

High-speed computerized trading, or high-frequency trading (HFT), is a type of algorithmic financial trading characterized by high speeds, high turnover rates, and high order-to-trade ratios that leverage high-frequency financial data and electronic trading tools.

In an HFT environment, it is imperative to reduce or minimize a round-trip latency between a networking device of an exchange and computing platform of a trader, without introducing bit errors, without passing jitter back to the networking device of the exchange, and without exceeding bandwidth and/or formatting parameters.

SUMMARY

Fast clock domain crossing architectures for high frequency trading are disclosed herein. One example is an apparatus that includes functional circuitry that generates an output in a first clock domain, encoding circuitry that computes an error detection code based on the output in the first clock domain, format circuitry that formats the output based on a communication protocol in a second clock domain, and error detection circuitry that evaluates the output for bit errors based on the error detection code and selectively cancels the formatted output based on the evaluation, in the second clock domain, where the encoding circuitry and the error detection circuitry are in parallel with the format circuitry.

Another example described herein is an apparatus that includes receive circuitry that recovers data and a clock from a received communication, a reference clock generator that generates a reference clock based on the recovered clock, where the reference clock generator includes a cleanup phase locked loop (PLL) circuit that filter jitter of the recovered clock, a local clock generator circuit that generates a local clock based on the reference clock, first functional circuitry that processes the recovered data based on the recovered clock, second functional circuitry that processes an output the functional circuitry based on the local clock, and a phase detector circuit that detect a phase difference between the recovered clock and the local clock, where the reference clock generator circuit further includes a variable delay line that adjusts a phase of the reference clock based on an output of the phase detector.

Another example described herein is method that includes generating an output in a first clock domain, computing an error detection code based on the output in the first clock domain, evaluating the output for bit errors based on the error detection code and selectively cancelling the output based on the evaluation in a second clock domain, and formatting the output based on a communication protocol in the second clock domain in parallel with the computing an error detection code and the evaluating the output for bit errors.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
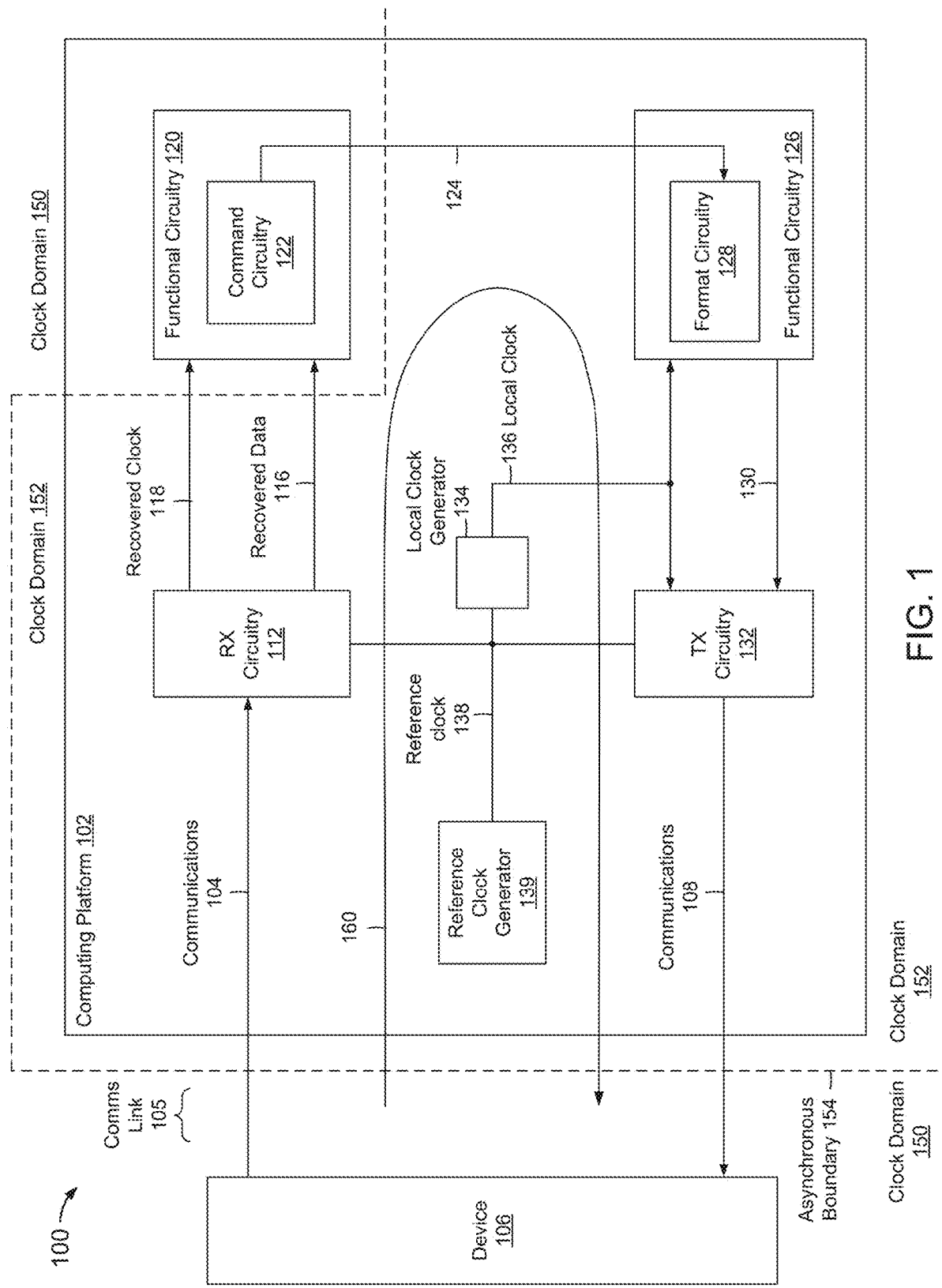
FIG. 1 is a block diagram of an environment in which a computing platform processes data in and across asynchronous clock domains, according to an embodiment.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the features or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

In environments or applications where low latency is important, such as in a HFT environment, it is imperative to reduce or minimize a round-trip latency between a networking device of the exchange and a computing platform of a trader. Such an HFT environment may be referred to as an ultra-low latency HFT environment.

One approach is to generate buy/sell decisions on a network interface card (NIC) of the computing platform of the trader. This may reduce or eliminate involvement of the main processor of the computing platform, which may reduce latency. A NIC solution may reduce the latency of the computing platform to, for example, approximately 15 nanoseconds (ns). An NIC solution may be referred to as network-side processing, because the processing involved takes place as close to the network interface as possible.

Another approach is for the financial instrument exchange to provide on-site accommodations for the computing platform of the trader. This is referred to a co-located environment. On-site accommodations may include space and power for the computing platform of the trader and a fiber optic communications link that supports, for example, 10 gigabyte Ethernet (GbE). The fiber optic communication link may incur a latency of approximately 3 nanoseconds (ns) of per meter (thus the importance of co-location).

In a HFT environment, a computing platform of a trader receives a communication from an exchange, recovers data and a clock from the communication, generates a buy/sell command based on the recovered data and the recovered clock, formats the command based on a local clock, and transmits the formatted command to the exchange.

In such a HFT environment, bit errors may arise due to the asynchronous crossing between the clock domain of the recovered clock and the clock domain of the local clock. Also, input jitter on the communication from the exchange may be transferred to the command sent back to the exchange and/or may cause additional bit errors. Conventional techniques to synchronize clock domains may increase latency and/or exceed bandwidth limitations and may not eliminate jitter-induced bit errors. Conventional techniques to detect and/or reduce bit errors may also increase latency.

Fast clock domain crossing architectures, such as for high frequency trading (HFT), are disclosed herein.

Embodiments herein describe synchronization techniques to synchronize a local clock to a recovered clock without passing jitter of the recovered clock to the local clock and without increasing a round-trip latency. The synchronization techniques may be useful to reduce bit errors that might otherwise arise when the buy/sell command is transferred from a clock domain of the recovered clock to a clock domain of the local clock.

Embodiments herein further describe error detection techniques to detect bit errors in buy/sell commands in the local clock domain, without increasing the round-trip latency. The error detection techniques may be useful to cancel a buy/sell command that contains bit errors so that the buy/sell command is not transmitted to the exchange.

The synchronization techniques and the error detection techniques may be practiced alone or in combination with one another.

FIG. 1 is a block diagram of an environment 100 in which a computing platform 102 processes data in and across asynchronous clock domains, according to an embodiment. In the example of FIG. 1, computing platform 102 communicates with a device 106 over a communication link 105. Communication link 105 carries communications 104 from device 106 to computing platform 102, and communications 108 from computing platform 102 to device 106.

For illustrative purposes, environment 100 is described herein as a high frequency trading (HFT) environment in which device 106 is associated with and/or operated by a financial instrument exchange, and computing platform 102 is associated with and/or operated by a trader and/or a trading entity. In this example, communications 104 may include information regarding financial instruments, and communications 108 may include a command, instruction, or order to invest in or divest from (i.e., buy and/or sell) a financial instrument. Techniques disclosed herein are not, however, limited to HFT environments.

Communications 104 and 108 may be formatted as packets, and may be formatted in accordance with a communication protocol, such as an Ethernet protocol (e.g., 10 gigabyte Ethernet or 10 GbE). In this example, device 106 may represent or include a router, switch, and/or other device(s) of a packet-switched network.

Further in the example of FIG. 1, computing platform 102 includes receive circuitry 112 that recovers data 116 and a clock 118 from communications 104 based on the communication protocol of communications 104. Recovered clock 118 represents or corresponds to a first clock domain 150.

Computing platform 102 further includes functional circuitry 120 that processes recovered data 116 in first clock domain 150. In other words, functional circuitry 120 is clocked by recovered clock 118 or a clock derived therefrom (e.g., a multiple/derivative/harmonic thereof).

Computing platform 102 further includes a reference clock generator 139 that generates a reference clock 138, and a local clock generator 134 that generates a local clock 136 based on reference clock 138. Local clock 136 represents or corresponds to a second clock domain 152.

Computing platform 102 further includes functional circuitry 126 that processes an output 124 of functional circuitry 120 in second clock domain 152. In other words, functional circuitry 126 is clocked by local clock 136, or a clock derived therefrom.

In the example of FIG. 1, functional circuitry 120 includes command circuitry 122 that generates output 124 as a command to buy and/or sell a financial instrument. Command circuitry 122 may process recovered data 116 with a trading algorithm and generate the command based on results of the trading algorithm.

Further in the example of FIG. 1, functional circuitry 126 includes format circuitry 128 that formats output 124 based on the communication protocol, to provide a formatted output 130. Format circuitry 128 may packetize output 124 (e.g., based on an Ethernet protocol).

Computing platform 102 further includes transmit circuitry 132 that transmits formatted output 130 to device 106 within communications 108. Formatted output 130 may be clocked into transmit circuitry 132 with local clock 136.

Figure 2:
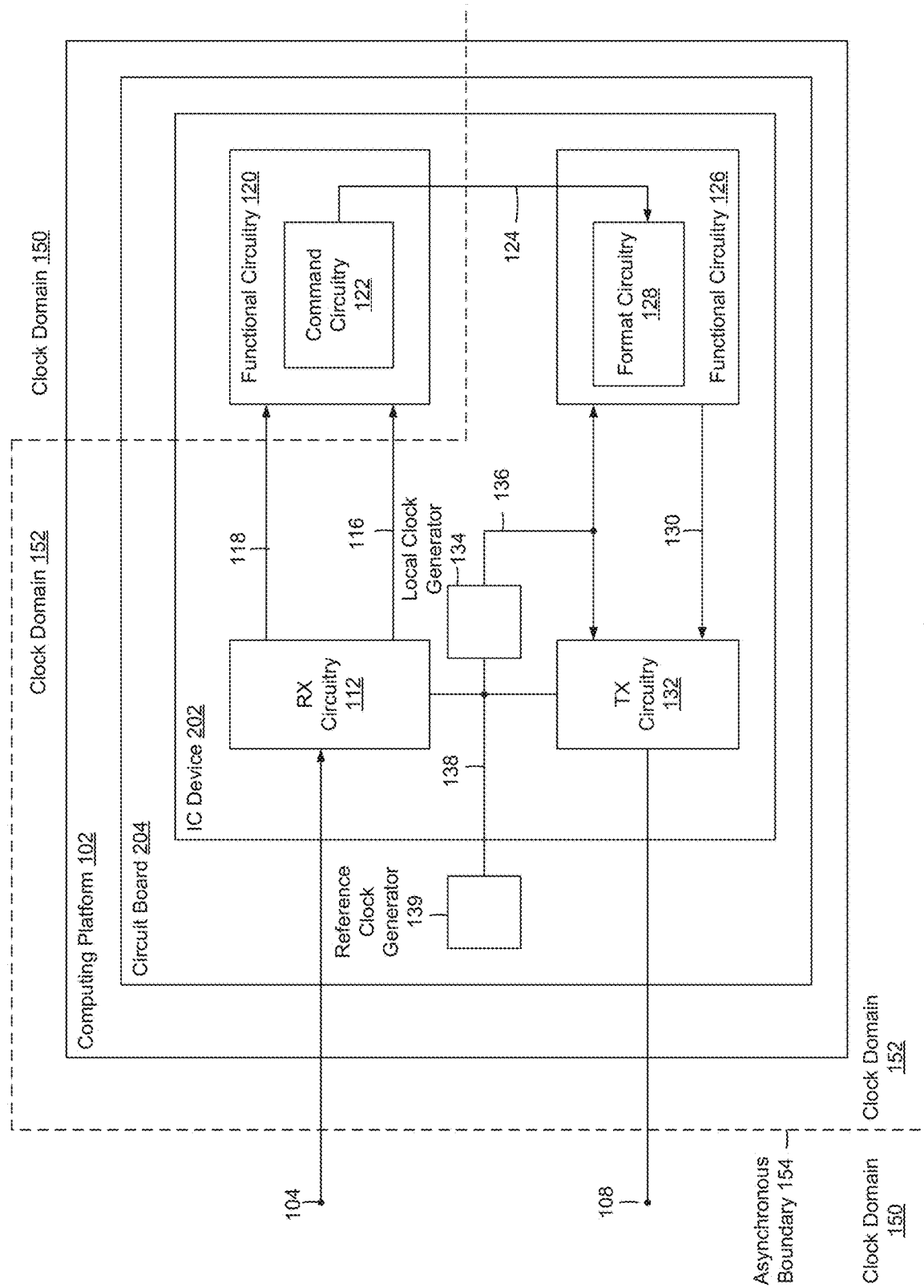
FIG. 2 is a block diagram of the computing platform in which receive circuitry, functional circuitry, functional circuitry, and transmit circuitry are part of an integrated circuit (IC) device (e.g., an IC die, chip, and/or field programmable gate array) mounted on a circuit board (e.g., a network interface controller or card) of the computing platform, according to an embodiment.

FIG. 2 is a block diagram of computing platform 102 in which receive circuitry 112, functional circuitry 120, functional circuitry 126, and transmit circuitry 132 are part of an integrated circuit (IC) device 202 (e.g., an IC die, chip, and/or field programmable gate array) mounted on a circuit board 204 (e.g., a network interface controller or card) of computing platform 102. Circuit board 204 may plug into a slot of a chassis of computing platform 102, and may interface with other resources, components, or devices of computing platform 102 over a communication link which may be based on a standard, such as a peripheral component interconnect express (PCIe) standard. In the example of FIG. 2, reference clock generator 139 resides on circuit board 204. Computing platform 102 is not, however, limited to the example of FIG. 2.

First and second clock domains 150 and 152 may be asynchronous with respect to one another (i.e., a frequency and/or phase of recovered clock 118 may differ from the frequency and/or phase of reference clock 138 and/or local clock 136). The asynchronous clock domains may lead to bit errors as output 124 crosses asynchronous boundary 154 (i.e., as output 124 is transferred from functional circuitry 120 to functional circuitry 126).

In addition, communications 104 may experience jitter (i.e., deviations in periodicity or frequency). The jitter may originate at device 106 and/or may arise in transit over communication link 105. The jitter may be retained by recovered clock 118 and/or recovered data 116, and thus may be passed back to device 106 via communications 108. Passing the jitter to device 106 may be render communications 108 non-compliant with the communication protocol of communication link 105. The jitter may also lead to bit errors in output 124 as it crosses asynchronous boundary 154 and/or as output 124 is processed by functional circuitry 126.

Various approaches for synchronizing first and second clock domains 150 and 152 and reducing jitter are disclosed below.

An approach for synchronization is to provide receive circuitry 112 and transmit circuitry 132 with buffers to resolve phase differences between reference clock 138 and recovered clock 118. To reduce round-trip latency 160, however, such buffers may be bypassed.

An approach for reducing bit errors is to transfer output 124 from functional circuitry 120 to functional circuitry 126 through a first-in-first-out (FIFO) buffer, where output 124 is clocked into the FIFO with recovered clock 118 and clocked out of the FIFO buffer with local clock 136. This, however, adds two clock cycles to round-trip latency 160. For clock cycles in a range of 5 to 10 ns, this approach adds significant latency to round-trip latency 160.

Another approach is to synchronize reference clock 138 to recovered clock 118 with a clock cleanup phase locked loop (PLL), essentially merging the two clock domains. This may minimize latency associated with crossing clock domains but may be of marginal use in the presence of input jitter. For example, if communications 104 has jitter, the jitter will be transferred to recovered clock 118, which will be transferred to local clock 136, which loads formatted output 130 into transmit circuitry 132. Transmit circuitry 132 will serialize formatted output 130 with a cleaned-up clock, and the jitter on recovered clock 118 will have to be absorbed by transmit circuitry 132, which may not be able to absorb the jitter, especially when in buffer bypass mode. Specifically, clock data recovery (CDR) circuitry within receive circuitry 112 may have a bandwidth in a range of few MHz, while the clock clean-up PLL may have a bandwidth in a sub-Hz range (e.g., in order to be compliant with an Ethernet protocol). All the jitter between these two frequencies will have to be absorbed by the buffer bypass mechanism, and this can result in bit errors in communications 108, which will be realized at device 106.

Another approach is to increase the bandwidth of the cleanup PLL to reduce the amount of jitter that transmit circuitry 132 has to absorb. This approach may reduce a probability of transmit bit errors, but may exceed parameter constraints of the communication protocol (i.e., an Ethernet interface of transmit circuitry 132 may be rendered non-compliant).

Disclosed below are synchronization techniques to synchronize first and second clock domains 150 and 152, without increasing round-trip latency 160 and without violating the communication protocol of communications 108. Synchronization techniques disclosed below may be useful to avoid passing jitter across asynchronous boundary 154 and/or to reduce bit errors. Synchronization techniques disclosed below may allow a relatively low bandwidth cleanup PLL (e.g., in accordance with an Ethernet standard), without using the margin of transmit circuitry 132 to absorb the input jitter when in buffer bypass mode.

Also disclosed below are error detection techniques to detect bit errors, without increasing round-trip latency 160 and without violating the communication protocol of communications 108. Error detection techniques disclosed below may be useful to cancel formatted output 130 (e.g., to prevent transmit circuitry 132 from transmitting formatted output 130), when formatted output 130 contains bit errors.

Synchronization and error detection techniques disclosed below may be implemented alone or in combination with one another.

Figure 3:
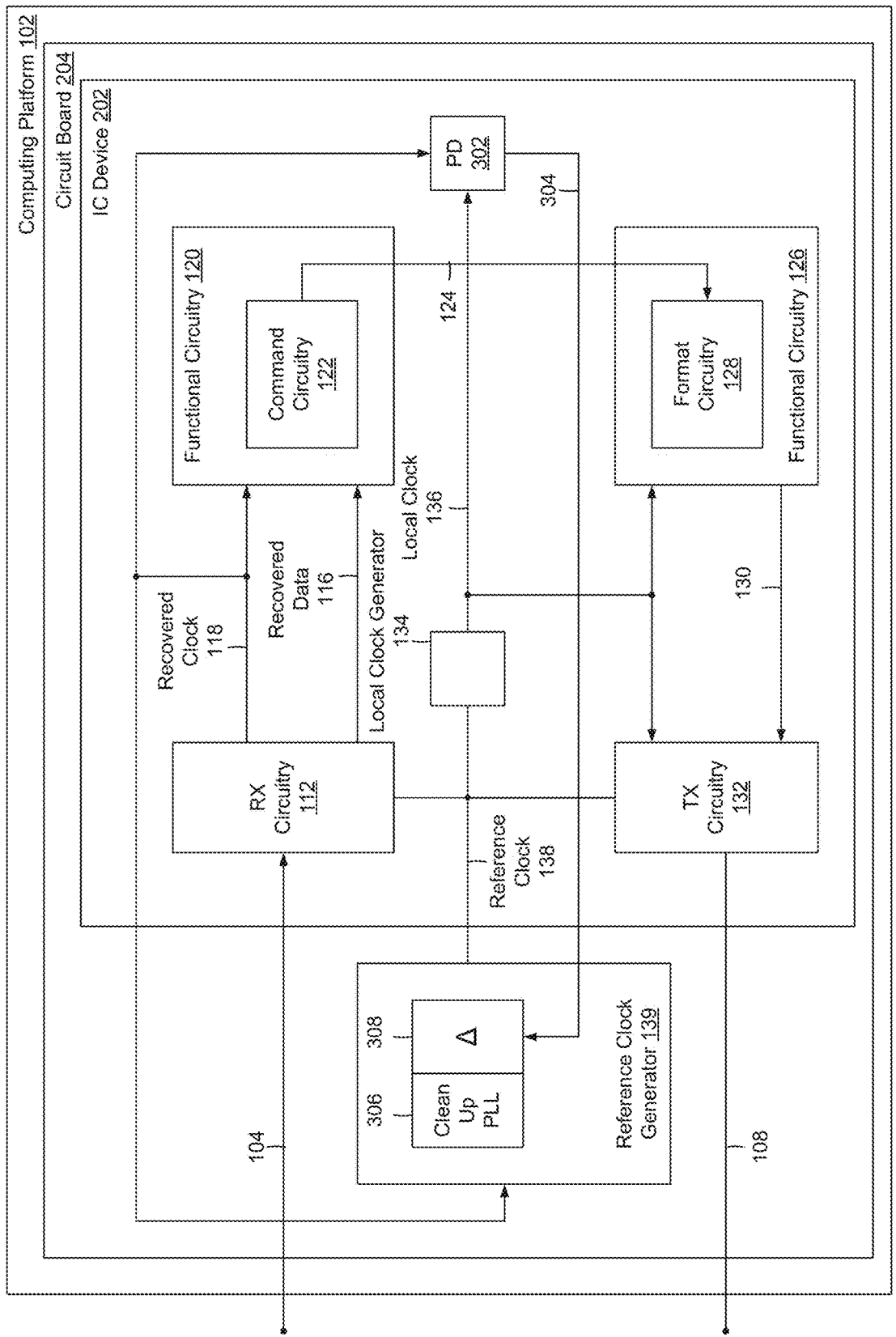
FIG. 3 is a block diagram of the computing platform, further including synchronization circuitry to synchronize a local clock to a recovered clock without passing jitter of the recovered clock to the local and without increasing a round-trip latency, according to an embodiment.

FIG. 3 is a block diagram of computing platform 102, further including synchronization circuitry to synchronize local clock 136 to recovered clock 118 without passing jitter of recovered clock 118 to local clock 136 and without increasing round-trip latency 160, according to an embodiment. In the example of FIG. 3, the synchronization circuitry includes a cleanup PLL 206 and a variable delay line 308 within reference clock generator 139, a phase detector 302, which may be positioned physically proximate to functional circuitry 120 and/or functional circuitry 126.

Figure 4:
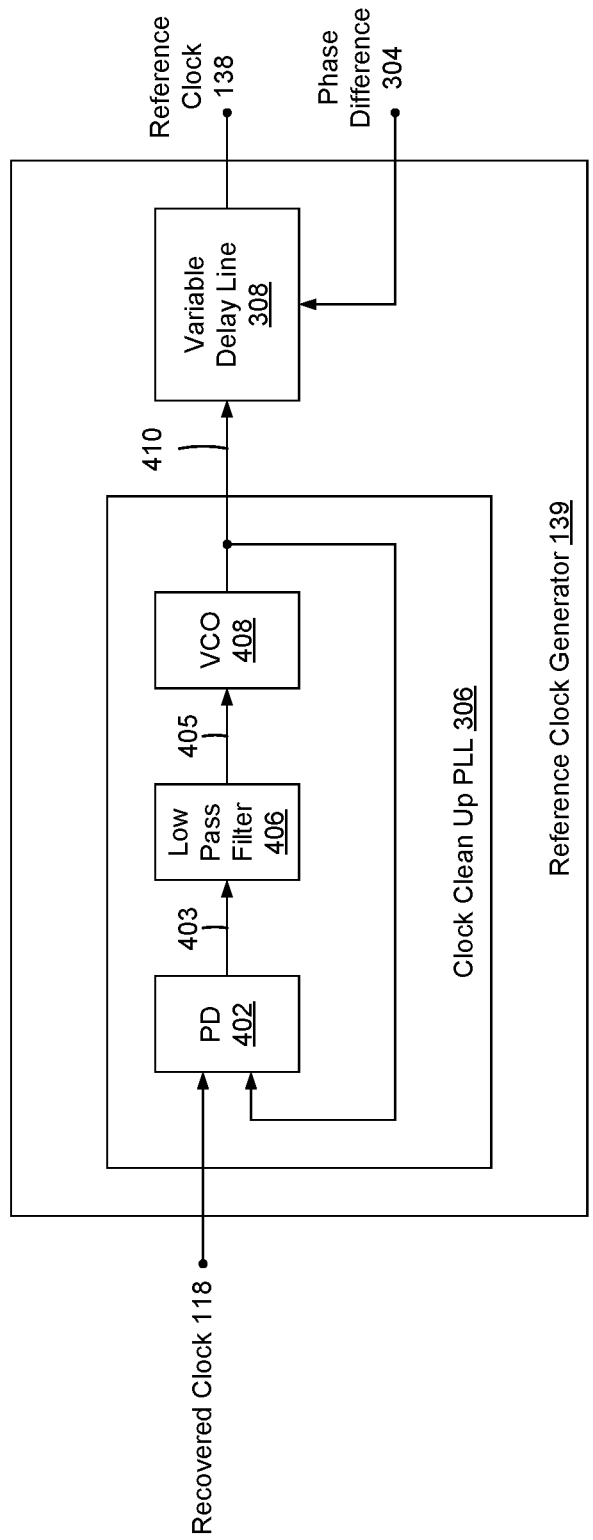
FIG. 4 is a block diagram of a reference clock generator, including example features of a cleanup phase locked loop, according to an embodiment.

FIG. 4 is a block diagram of reference clock generator 139, including example features of cleanup PLL 306, according to an embodiment. FIGS. 3 and 4 are described below with reference to FIG. 5.

Figure 5:
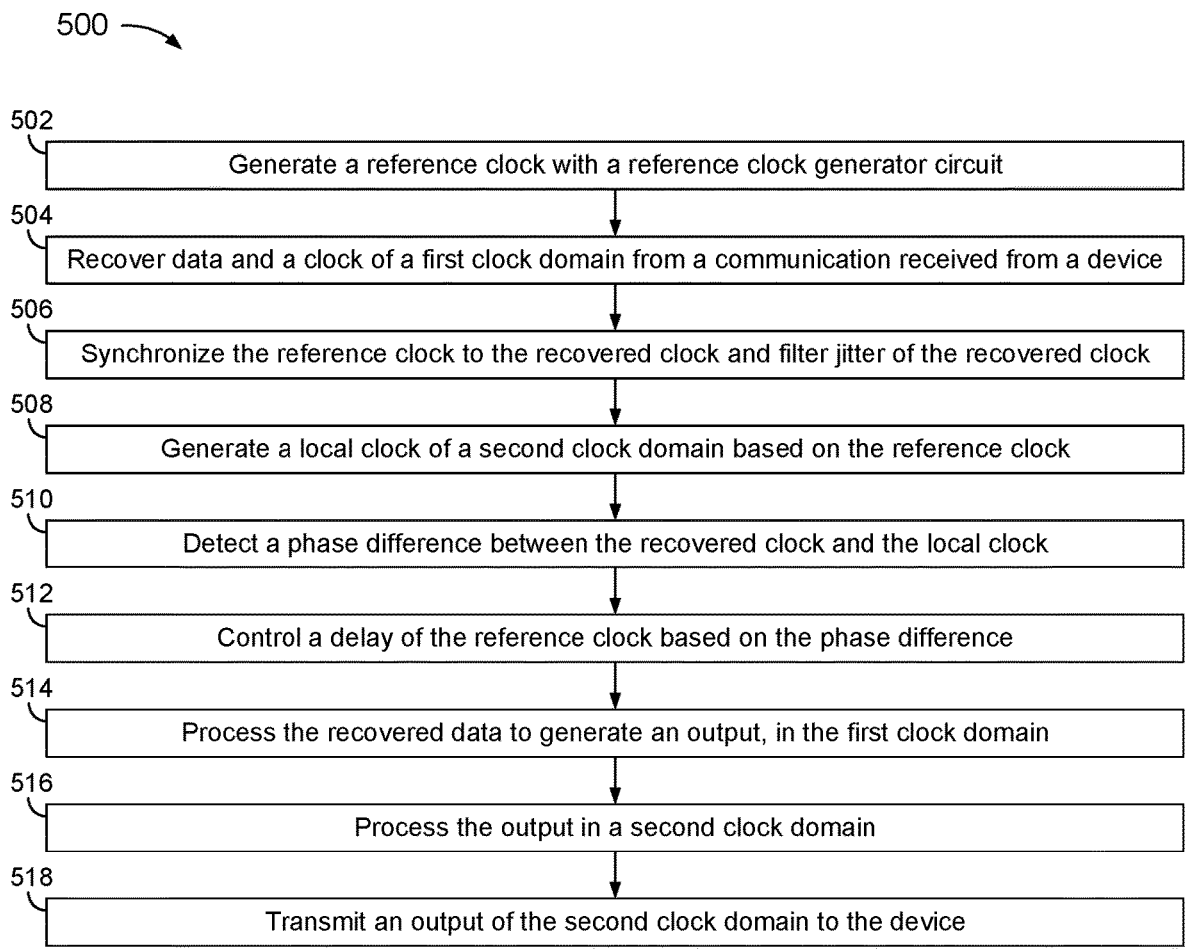
FIG. 5 is a flowchart of a method of synchronizing first and second clock domains, without passing input jitter from the first clock domain to the second clock domain, according to an embodiment.

FIG. 5 is a flowchart of a method 500 of synchronizing first and second clock domains, without passing input jitter from the first clock domain to the second clock domain, according to an embodiment. Method 500 is described below with reference to FIGS. 3 and 4. Method 500 is not, however, limited to the examples of FIGS. 3 and 4.

At 502, reference clock generator 139 generates reference clock 138. In FIG. 4, a VCO 408 generates a clock 410 when power is applied to reference clock generator 139. Clock 410 passes through a variable delay line 208 to provide reference clock 138.

At 504, receive circuitry 112 recovers data 116 and clock 118 from communications 104. Receive circuitry 112 may be clocked by reference clock 138.

At 506, reference clock generator 139 synchronizes reference clock 138 to recovered clock 118, and filters jitter of recovered clock 118. In FIG. 4, a phase detector 402 of cleanup PLL 306 detects a phase difference 403 between clock 410 and recovered clock 118, a low-pass filter (LPF) 406 filters jitter from phase difference 403, and VCO 408 controls a frequency and phase of clock 410 based on an output 405 of LPF 406 to reduce phase difference 403.

At 508, local clock generator 134 generates local clock 136 based on reference clock 138.

At 510, phase detector 302 detects a phase difference 304 between recovered clock 118 and local clock 136.

At 512, reference clock generator 139 controls a delay of reference clock 138 based on phase difference 304. In FIG. 4, variable delay line 308 controls the delay of reference clock 138 based on phase difference 304.

Phase detector 302 and variable delay line 308 may be useful to compensate for latency of a path over which recovered clock 118 travels to reach reference clock generator 139, and/or latency of paths of reference clock 138 and local clock 136. In FIG. 2, phase detector 302 and variable delay line 308 may be useful to compensate for latency between IC device 202 and circuit board 204.

In FIG. 3, for example, the version of recovered clock 118 presented to cleanup PLL 306 is delayed relative to the version of recovered clock 118 provided to functional circuitry 120. As a result, reference clock 138, as output by reference clock generator 139, has a phase delay relative to the version of recovered clock 118 provided to functional circuitry 120. Additional delay may be imparted to reference clock 138 as it travels to local clock generator 134. Local clock generator 134 transfers the phase delay to local clock 136, and local clock 136 may encounter additional delay as it travels to functional circuitry 126. Absent phase detector 302 and variable delay line 308, functional circuitry 120 and functional circuitry 126 would thus remain asynchronous relative to one another. In FIGS. 3 and 4, phase detector 302 detects a local phase difference 304 between recovered clock 118 and local clock 136, at a location that may be physically proximate to functional circuitry 120 and/or functional circuitry 126, and variable delay line 308 essentially subtracts phase difference 304 from reference clock 138 to thereby synchronize local clock 136 to the version of recovered clock 118 provided to functional circuitry 120.

At 514, functional circuitry 120 processes recovered data 116 in first clock domain 150. In the illustrated examples, command circuitry 122 generates output 124 in first clock domain 150 based on recovered data 116 and recovered clock 118.

At 516, functional circuitry 126 processes output 124 in second clock domain 152. In the illustrated examples, format circuitry 128 formats output 124 in second clock domain 152 to provide formatted output 130 based on local clock 136.

At 518, transmit circuitry 132 transmits an output of functional circuitry 126 to device 106 over communication link 105. In the illustrated examples, transmit circuitry 132 transmits formatted output 130 to device 106.

Method 500 may be useful to synchronize local clock 136 to recovered clock 118 without transferring input jitter from recovered clock 118 to reference clock 138 or local clock 136. Output 124 may thus be clocked out of functional circuitry 120 and into functional circuitry 126 synchronously, jitter free, and without increasing round-trip latency 160.

In some situations, excessive jitter on recovered clock 118 may, nevertheless, result in bit errors in output 124 as output 124 is clocked into and/or processed within functional circuitry 126. Such bit errors may be detected without increasing round-trip latency 160 with error detection circuitry described below with reference to FIGS. 6 and 7. The error detection circuitry may be implemented alone or in combination with the synchronization circuitry of FIGS. 3 and 4. For example, in some situations or environments, the error detection circuitry is sufficient to deal with bit errors, in which case the synchronization circuitry of FIGS. 3 and 4 may be omitted, which may reduce area and/or power consumption.

Figure 6:
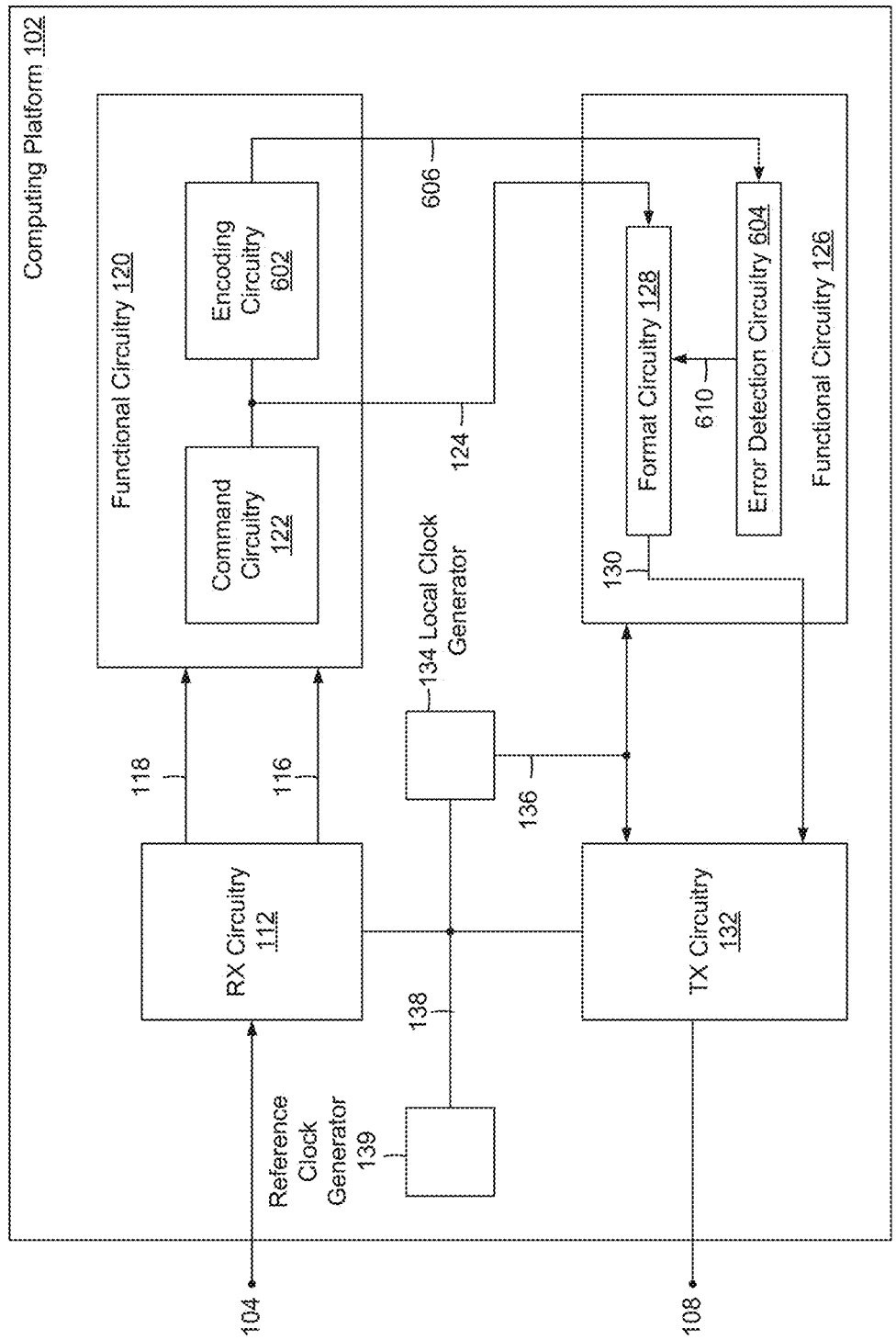
FIG. 6 is a block diagram of the computing platform, further including error detection circuitry that detects bit errors across an asynchronous boundary without increasing a round-trip latency, according to an embodiment.

FIG. 6 is a block diagram of computing platform 102, further including error detection circuitry that detects bit errors across asynchronous boundary 154 without increasing round-trip latency 160, according to an embodiment. In the example of FIG. 6, the error detection circuitry includes encoding circuitry 602 that computes an error detection code 606 based on output 124 in first clock domain 150, and error detection circuitry 604 that determines whether output 124 contains a bit error, in second clock domain 152. Encoding circuitry 602 and error detection circuitry 604 may operate in parallel with format circuitry 128 such that encoding circuitry 602 and error detection circuitry 604 do not increase round-trip latency 160. Encoding circuitry 602 and error detection circuitry 604 are described below with reference to FIG. 7.

Figure 7:
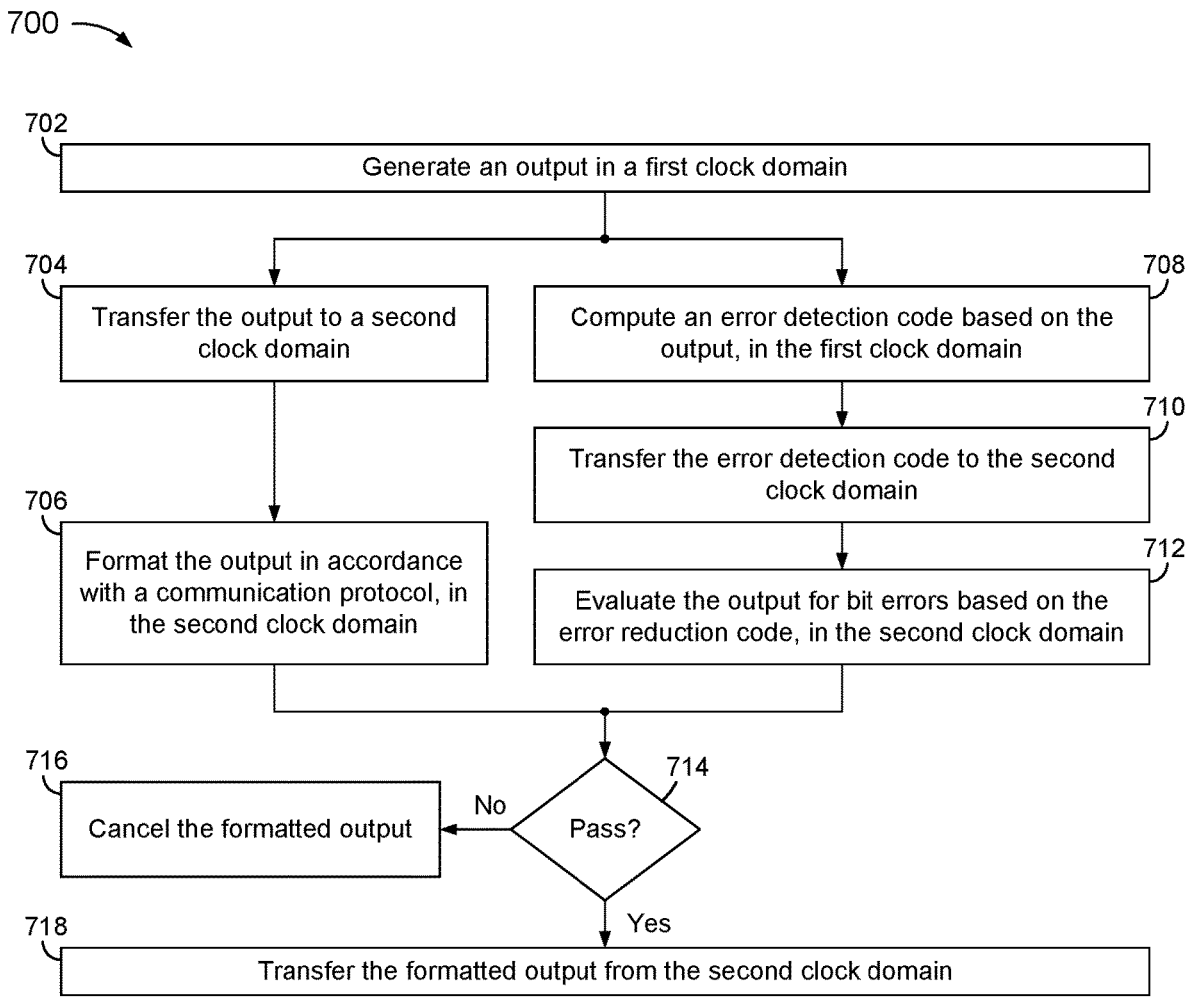
FIG. 7 is a flowchart of a method of detecting bit errors across an asynchronous boundary, according to an embodiment.

FIG. 7 is a flowchart of a method 700 of detecting bit errors across an asynchronous boundary, according to an embodiment. Method 700 is described below with reference to FIG. 6. Method 700 is not, however, limited to the example of FIG. 6.

At 702, functional circuitry 120 generates output 124 based on recovered data 116, in first clock domain 150.

At 704, functional circuitry 120 transfers output 124 to second clock domain 152. In an embodiment, output 124 is clocked out of functional circuitry 120 with recovered clock 118, and is clocked into functional circuitry 126 with local clock 136. If recovered dock 118 and local clock 136 are asynchronous with respect to one another and/or if there is relatively significant jitter on recovered clock 118 and/or on output 124, one or more bit errors may be imparted to output 124 as it is clocked into functional circuitry 126.

At 706, functional circuitry 126 processes output 124 in second clock domain 152. In FIG. 6, format circuitry 128 formats output 124 to provide formatted output 130.

At 708, encoding circuitry 602 computes error detection code 606 based on output 124, in first clock domain 150. As an example, and without limitation, encoding circuitry 602 may compute error detection code 606 as a parity bit, a checksum, and/or a cyclic redundancy check (CRC).

At 710, functional circuitry 120 transfers error detection code 606 to second clock domain 152.

At 712, error detection circuitry 604 evaluates output 124 for bit errors based on error detection code 606, in second clock domain 152. Functional circuitry 120 and functional circuitry 126 may perform the computing at 708, the transferring at 710, and the evaluating at 712 in parallel with the transferring at 704 and the formatting at 706, such that the computing at 708, the transferring at 710, and the evaluating at 712 do not increase round-trip latency 160.

At 714, if a bit error is detected at 712, functional circuitry 126 cancels formatted output 130. In FIG. 6, error detection circuitry 604 provides a result 610 of the evaluation to format circuitry 128. If result 610 indicates a bit error, format circuitry 128 discards formatted output 130 rather than providing formatted output 130 to transmit circuitry 132. If no error is detected at 712, functional circuitry 126 provides formatted output 130 to transmit circuitry 132.

At 718, transmit circuitry 132 transmits formatted output 130 to device 106 over communication link 105.

Figure 8:
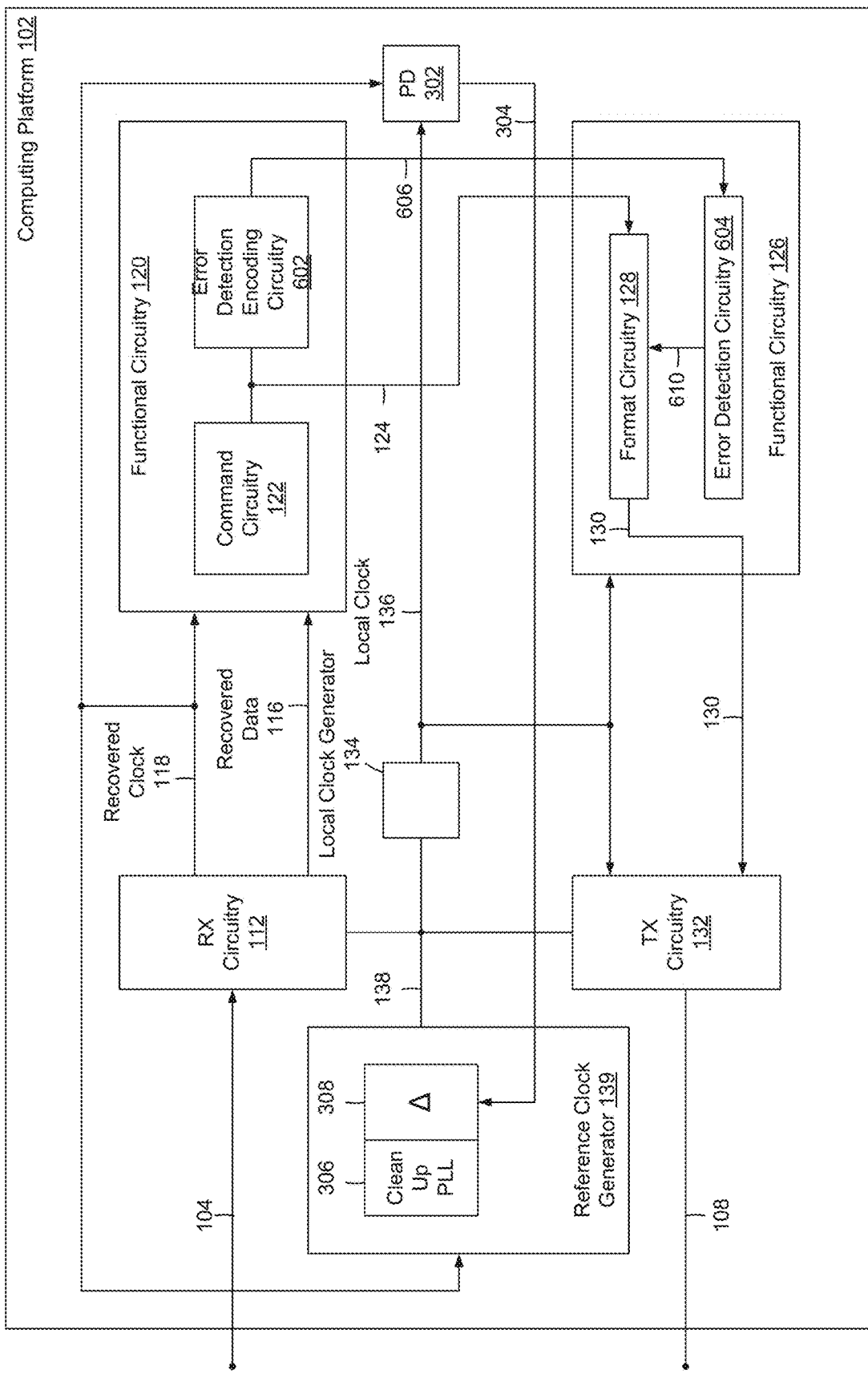
FIG. 8 is a block diagram of the computing platform, further including the synchronization circuitry of FIG. 3 and the error detection circuitry of FIG. 6, according to an embodiment.

FIG. 8 is a block diagram of computing platform 102, further including the synchronization circuitry of FIG. 3 and the error detection circuitry of FIG. 6, according to an embodiment. Computing platform 102, as illustrated in FIG. 8, may operate as illustrated in FIG. 9.

Figure 9:
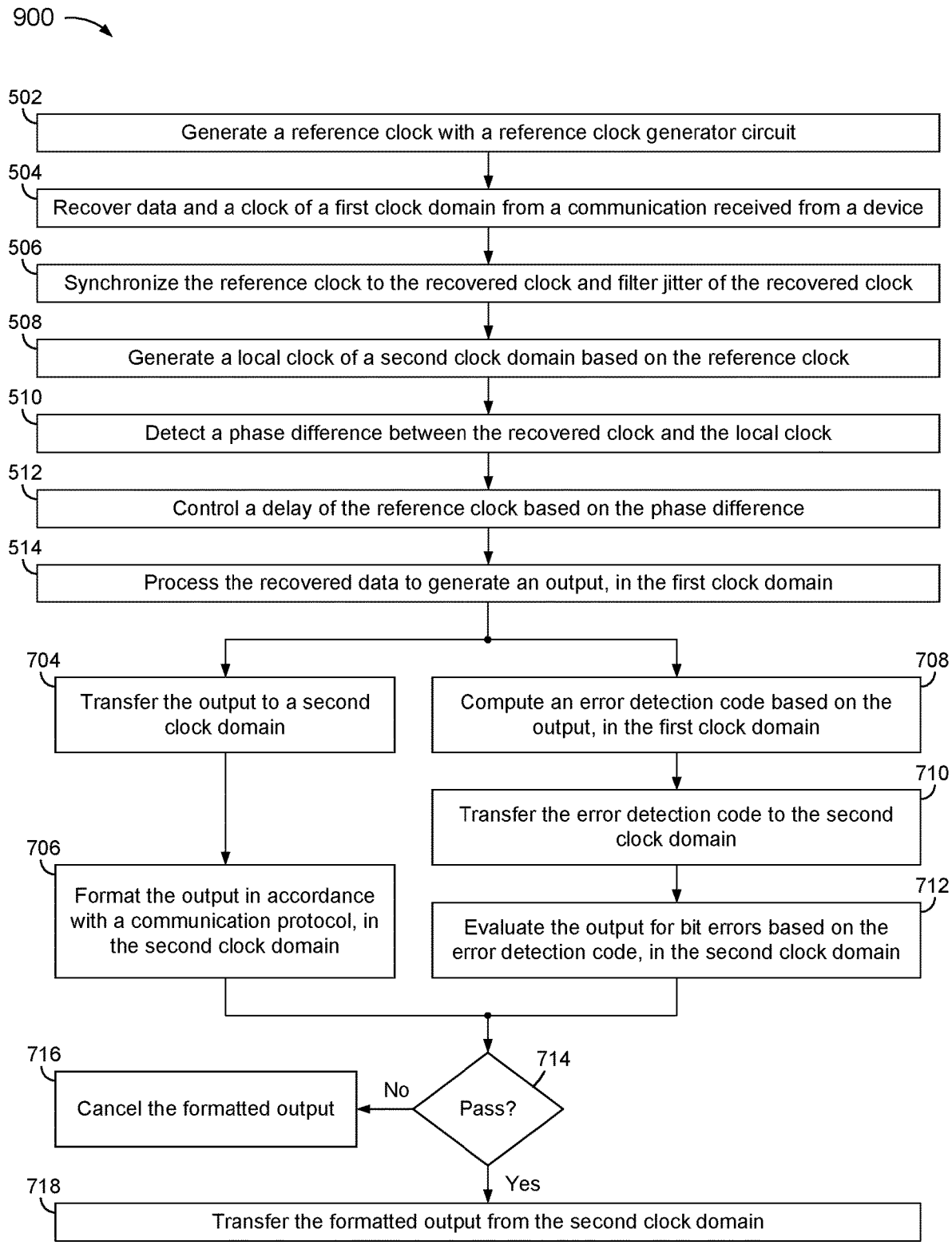
FIG. 9 is a flowchart of method of synchronizing first and second clock domains and detecting bit errors across an asynchronous boundary of the first and second clock domains, according to an embodiment.

FIG. 9 is a flowchart of method 900 of synchronizing first and second clock domains and detecting bit errors across an asynchronous boundary of the first and second clock domains, according to an embodiment. Method 900 includes features 502 through 514 of method 500, and features 704 through 718 of method 700, which are described further above.

Figure 10:
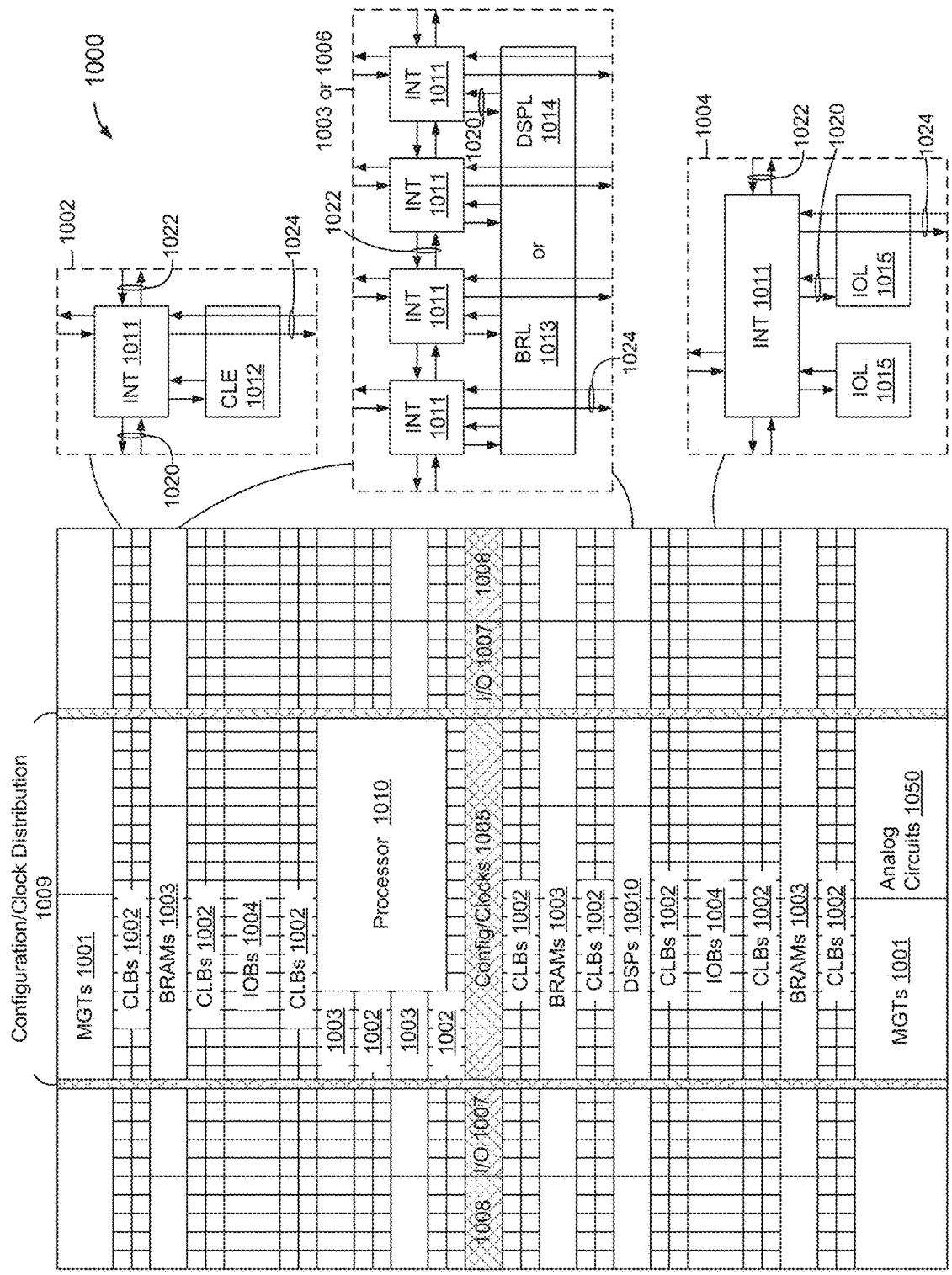
FIG. 10 is a block diagram of configurable circuitry of the computing platform, including an array of configurable or programmable circuit blocks or tiles, according to an embodiment.

Computing platform 102 or a portion thereof (e.g., IC device 202), may include one or more of a variety of types of configurable circuit blocks, such as described below with reference to FIG. 10. FIG. 10 is a block diagram of configurable circuitry 1000, including an array of configurable or programmable circuit blocks or tiles, according to an embodiment. The example of FIG. 10 may represent a field programmable gate array (FPGA) and/or other IC device(s) that utilizes configurable interconnect structures for selectively coupling circuitry/logic elements, such as complex programmable logic devices (CPLDs).

In the example of FIG. 10, the tiles include multi-gigabit transceivers (MGTs) 1001, configurable logic blocks (CLBs) 1002, block random access memory (BRAM) 1003, input/output blocks (IOBs) 1004, configuration and clocking logic (Config/Clocks) 1005, digital signal processing (DSP) blocks 1006, specialized input/output blocks (I/O) 1007 (e.g., configuration ports and clock ports), and other programmable logic 1008, which may include, without limitation, digital clock managers, analog-to-digital converters, and/or system monitoring logic. The tiles further includes a dedicated processor 1010.

One or more tiles may include a programmable interconnect element (INT) 1011 having connections to input and output terminals 1020 of a programmable logic element within the same tile and/or to one or more other tiles. A programmable INT 1011 may include connections to interconnect segments 1022 of another programmable INT 1011 in the same tile and/or another tile(s). A programmable INT 1011 may include connections to interconnect segments 1024 of general routing resources between logic blocks (not shown). The general routing resources may include routing channels between logic blocks (not shown) including tracks of interconnect segments (e.g., interconnect segments 1024) and switch blocks (not shown) for connecting interconnect segments. Interconnect segments of general routing resources (e.g., interconnect segments 1024) may span one or more logic blocks. Programmable INTs 1011, in combination with general routing resources, may represent a programmable interconnect structure.

A CLB 1002 may include a configurable logic element (CLE) 1012 that can be programmed to implement user logic. A CLB 1002 may also include a programmable INT 1011.

A BRAM 1003 may include a BRAM logic element (BRL) 1013 and one or more programmable INTs 1011. A number of interconnect elements included in a tile may depends on a height of the tile. A BRAM 1003 may, for example, have a height of five CLBs 1002. Other numbers (e.g., four) may also be used.

A DSP block 1006 may include a DSP logic element (DSPL) 1014 in addition to one or more programmable INTs 1011. An IOB 1004 may include, for example, two instances of an input/output logic element (IOL) 1015 in addition to one or more instances of a programmable INT 1011. An I/O pad connected to, for example, an I/O logic element 1015, is not necessarily confined to an area of the I/O logic element 1015.

In the example of FIG. 10, config/clocks 1005 may be used for configuration, clock, and/or other control logic. Vertical columns 1009 may be used to distribute clocks and/or configuration signals.

A logic block (e.g., programmable of fixed-function) may disrupt a columnar structure of configurable circuitry 1000. For example, processor 1010 spans several columns of CLBs 1002 and BRAMs 1003. Processor 1010 may include one or more of a variety of components such as, without limitation, a single microprocessor to a complete programmable processing system of microprocessor(s), memory controllers, and/or peripherals.

In FIG. 10, configurable circuitry 1000 further includes analog circuits 1050, which may include, without limitation, one or more analog switches 107, multiplexers, and/or de-multiplexers. Analog switches 107 may be useful to reduce leakage current.

FIG. 10 is provided for illustrative purposes. Configurable circuitry 1000 is not limited to numbers of logic blocks in a row, relative widths of the rows, numbers and orderings of rows, types of logic blocks included in the rows, relative sizes of the logic blocks, illustrated interconnect/logic implementations, or other example features of FIG. 10.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the users computer and partly on a remote computer or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

The invention claimed is:

1. An apparatus, comprising:
   first functional circuitry configured to operate in a first clock domain, wherein the first functional circuitry comprises,
      command circuitry configured to generate a command, and
      encoding circuitry configured to compute an error detection code based on the command; and
   second functional circuitry configured to operate in a second clock domain, wherein the second functional circuitry comprises,
      format circuitry configured to format the command based on a communication protocol, and
      error detection circuitry configured to evaluate the command for bit errors based on the error detection code and to selectively cancel the formatted command based on the evaluation;
   wherein the encoding circuitry and the error detection circuitry are configured in parallel with the format circuitry.

2. The apparatus of claim 1, wherein the first and second clock domains are asynchronous with one another.

3. The apparatus of claim 1, wherein a sum of delays of the encoding circuitry and the error detection circuitry is less than or equal to a delay of the format circuitry.

4. The apparatus of claim 1, further comprising:
   receive circuitry configured to recover data and a clock of the first clock domain from a received communication, wherein the command circuitry is further configured to generate the command based on the recovered data and the recovered clock; and
   transmit circuitry configured to transmit the formatted command.

5. The apparatus of claim 4, further comprising:
   a reference clock generator circuit configured to generate a reference clock of the second clock domain based on the recovered clock, wherein the reference clock generator circuit comprises a cleanup phase locked loop (PLL) circuit configured to filter jitter of the recovered clock;

a local clock generator circuit configured to generate a local clock of the second clock domain based on the reference clock, wherein the format circuitry is clocked with the local clock; and a phase detector configured to detect a phase difference between the recovered clock and the local clock;

wherein the reference clock generator circuit further comprises a variable delay line configured to adjust a phase of the reference clock based on an output of the phase detector.

6. The apparatus of claim 5, wherein the phase detector and the variable delay line are further configured to compensate for latency incurred by the recovered clock, the reference clock, and the local clock.

7. The apparatus of claim 5, further comprising a circuit board and an integrated circuit (IC) device mounted to the circuit board, wherein:

the circuit board comprises the reference clock generator circuit;

the IC device comprises the receive circuitry, the first and second functional circuitry, the local clock generator circuit, and the phase detector; and the phase detector and the variable delay line are further configured to compensate for latency between the IC device and the circuit board.

8. The apparatus of claim 7, wherein the circuit board is configured as a network interface controller.

9. The apparatus of claim 4, wherein:

a sum of delays of the receive circuitry, the command circuitry, the format circuitry, and the transmit circuitry is less than 20 nanoseconds; and a sum of delays of the encoding circuitry and the error detection circuitry is less than or equal to the delay of the format circuitry.

10. The apparatus of claim 4, wherein:

the receive circuitry and the transmit circuitry are configured to interface with a financial instrument exchange over a communication link; and the command circuitry is further configured to generate the command as a command to invest in or divest from a financial instrument based on the recovered data and a trading algorithm.

11. The apparatus of claim 4, wherein the apparatus is configured as a network interface controller.

12. A method, comprising:

generating a command in a first clock domain;

computing an error detection code based on the command, in the first clock domain;

evaluating the command for bit errors based on the error detection code and selectively cancelling the command based on the evaluation, in a second clock domain; and formatting the command based on a communication protocol to provide a formatted command, in the second clock domain, in parallel with the computing the error detection code and the evaluating the command for the bit errors.

13. The method of claim 12, wherein a sum of delays of the computing the error detection code and the evaluating the command is less than or equal to a delay of the formatting.

14. The method of claim 12, further comprising:

recovering data and a clock of the first clock domain from a received communication, wherein the generating the command comprises generating the command based on the recovered data and the recovered clock;

generating a reference clock based on the recovered clock, wherein the generating the reference clock comprises filtering jitter of the recovered clock with a cleanup phase locked loop;

generating a local clock of the second clock domain based on the reference clock; and detecting a phase difference between the recovered clock and the local clock;

wherein the generating the reference clock further comprises adjusting a delay of the reference clock based on the phase difference between the recovered clock and the local clock.

15. The method of claim 14, further comprising:

interfacing with a financial instrument exchange over a communication link, including receiving the communication from a device of the financial instrument exchange and transmitting the formatted command to the device of the financial instrument exchange;

wherein the generating the command comprises generating the command as a command to invest in or divest from a financial instrument based on the recovered data and a trading algorithm.

16. The method of claim 14, further comprising transmitting the formatted command, wherein:

a sum of delays of the recovering the data, the generating the command, the formatting the command, and the transmitting the formatted command is less than 20 nanoseconds; and a sum of delays of the computing the error detection code and the evaluating the command is less than or equal to the delay of the formatting the command.

\* \* \* \* \*